(12) United States Patent
Kamath et al.

(10) Patent No.: US 10,887,204 B2
(45) Date of Patent: Jan. 5, 2021

(54) NETWORK INFRASTRUCTURE MANAGEMENT

(71) Applicant: Hewlett Packard Enterprise Development LP, Houston, TX (US)

(72) Inventors: Harish B. Kamath, Bengalooru (IN); Vijay Vishwanath Hegde, Bangalore Karnataka (IN); Deepak Khungar, Bangalore Karnataka (IN); Michael Lee Witkowski, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 100 days.

(21) Appl. No.: 16/102,274

(22) Filed: Aug. 13, 2018

(65) Prior Publication Data

US 2020/0052987 A1 Feb. 13, 2020

(51) Int. Cl.
| | | |
|---|---|---|
| *H04L 12/26* | (2006.01) | |
| *H04L 12/24* | (2006.01) | |
| *H04L 29/12* | (2006.01) | |
| *H04L 12/46* | (2006.01) | |

(52) U.S. Cl.
CPC .............. *H04L 43/08* (2013.01); *H04L 41/14* (2013.01); *H04L 12/4641* (2013.01); *H04L 61/6022* (2013.01)

(58) Field of Classification Search
CPC ...... H04W 24/08; H04W 24/02; H04L 43/04; H04L 43/045; H04L 41/142; H04L 43/12; H04L 41/16; H04L 43/0811; H04L 43/10; H04L 43/08; H04L 12/24; H04L 41/0813; H04L 12/4641; H04L 41/14; H04L 12/26
See application file for complete search history.

(56) References Cited

U.S. PATENT DOCUMENTS

| | | | |
|---|---|---|---|
| 7,373,364 B1 * | 5/2008 | Chapman | ............ G06F 11/1451 |
| 7,548,944 B2 | 6/2009 | Sahita et al. | |
| 7,577,736 B1 | 8/2009 | Ovenden et al. | |
| 7,855,967 B1 | 12/2010 | Rangavajjhala et al. | |
| 8,111,707 B2 | 2/2012 | Riddle et al. | |
| 8,374,102 B2 | 2/2013 | Luft et al. | |
| 8,392,995 B2 * | 3/2013 | Williamson | ............ H04L 43/00 |
| | | | 726/25 |

(Continued)

OTHER PUBLICATIONS

Putzolu, D.M.; "Software API Framework Implementation Agreement"; 2002; 21 pages.

*Primary Examiner* — Sargon N Nano
(74) *Attorney, Agent, or Firm* — Hewlett Packard Enterprise Patent Department (57) ABSTRACT

Example techniques of network infrastructure management are described. In an example, a network statistics request is received by a network device from a computing device. The network statistics request indicates at least one of a node and a data path, in a layer of a network stack in a network infrastructure, for which a network statistics attribute is to be determined. The network statistics attribute is representative of information associated with one of data packets transceived by the node and data packets transferred over the data path. The network statistics attribute is determined based on the value of a counter associated with the network statistics attribute of one of the node and the data path. The determined network statistics attribute is provided to the computing device.

15 Claims, 9 Drawing Sheets

(56) References Cited

U.S. PATENT DOCUMENTS

| | | | |
|---|---|---|---|
| 8,856,077 B1* | 10/2014 | Roth | G06F 9/5072 |
| | | | 707/638 |
| 9,075,788 B1* | 7/2015 | Roth | G06F 11/1438 |
| 9,210,178 B1* | 12/2015 | Roth | H04L 63/105 |
| 9,825,865 B1 | 11/2017 | Sharma et al. | |
| 10,142,174 B2* | 11/2018 | Yang | H04L 41/5054 |
| 10,469,330 B1* | 11/2019 | Roth | H04L 41/22 |
| 10,581,755 B2* | 3/2020 | Jain | H04L 47/82 |
| 10,721,183 B2* | 7/2020 | Jasperson, Jr. | H04L 67/16 |
| 2006/0064687 A1* | 3/2006 | Dostert | G06F 11/3612 |
| | | | 718/1 |
| 2017/0118041 A1 | 4/2017 | Bhattacharya et al. | |
| 2018/0152384 A1* | 5/2018 | Kakadia | H04L 43/026 |

* cited by examiner

NETWORK DEVICE 100

PROCESSOR(S) 102

MEMORY 104

[[RECEIVE A NETWORK STATISTICS REQUEST FROM A COMPUTING DEVICE, THE NETWORK STATISTICS REQUEST INDICATING AT LEAST ONE OF A NODE AND A DATA PATH, IN A LAYER OF A NETWORK STACK IN A NETWORK INFRASTRUCTURE, FOR WHICH A NETWORK STATISTICS ATTRIBUTE IS TO BE DETERMINED, THE NETWORK STATISTICS ATTRIBUTE BEING REPRESENTATIVE OF INFORMATION ASSOCIATED WITH ONE OF DATA PACKETS TRANSCEIVED BY THE NODE AND DATA PACKETS TRANSFERRED OVER THE DATA PATH;

DETERMINE THE NETWORK STATISTICS ATTRIBUTE BASED ON A VALUE OF A COUNTER ASSOCIATED WITH THE NETWORK STATISTICS ATTRIBUTE OF ONE OF THE NODE AND THE DATA PATH, WHERE THE VALUE OF THE COUNTER IS UPDATED BASED ON A DATA PACKET BEING TRANSCEIVED BY THE NODE AND A DATA PACKET BEING TRANSFERRED OVER THE DATA PATH;

CAPTURE A PLURALITY OF SNAPSHOTS, EACH SNAPSHOT OF THE PLURALITY OF SNAPSHOTS BEING CAPTURED AT A PRE-DEFINED TIME INTERVAL, WHERE EACH SNAPSHOT DEPICTS THE VALUE OF THE COUNTER AT A TIME INSTANCE AT WHICH THE SNAPSHOT IS CAPTURED;

PERIODICALLY TRANSMIT A BUNDLE OF THE PLURALITY OF SNAPSHOTS TO THE COMPUTING DEVICE]]

Counter Association Table

| VLAN | MAC Address | Packet Count | Traffic Volume (KB) |
|---|---|---|---|
| vlan-2 | ALL | Compute | Compute |
| vlan-4 | 00:50:56:bf:73:fc | Compute | Compute |
| vlan-4 | 00:50:56:bf:74:3e | Compute | Compute |
| vlan-5 | ALL | Compute | None |
| vlan-6 | ALL | Compute | Compute |
| vlan-8 | 00:50:56:bf:21:8b | None | Compute |
| vlan-8 | 00:50:56:bf:55:96 | None | Compute |

310 — (first row); 312 — (vlan-8 row)
302 — VLAN; 304 — MAC Address; 306 — Packet Count; 308 — Traffic Volume (KB)

Counter Association Table

| VLAN | Source MAC Address | Dst. MAC Address | Packet Count | Traffic Volume (KB) |
|---|---|---|---|---|
| vlan-2 | 00:50:56:bf:2c:ca | 00:50:56:bf:7d:8f | Compute | Compute |
| vlan-3 | 00:50:56:bf:30:be | 00:50:56:bf:62:e9 | Compute | Compute |
| vlan-4 | 00:50:56:bf:74:3e | 00:50:56:bf:73:fc | Compute | Compute |
| vlan-6 | 00:50:56:bf:67:f8 | 00:50:56:bf:4e:e0 | Compute | Compute |
| vlan-8 | 00:50:56:bf:55:96 | 00:50:56:bf:21:8b | Compute | Compute |
| vlan-10 | 00:50:56:bf:27:3b | 01:00:5e:00:00:fb | Compute | Compute |

314 — VLAN; 316 — Source MAC Address; 318 — Dst. MAC Address; 320 — Packet Count; 322 — Traffic Volume (KB)

| | | | | Snapshot captured at time instance t | | |
|---|---|---|---|---|---|---|
| VLAN | MAC Address | Interface | Packet Count | Traffic Volume (Kbytes) | State information | Port information |
| vlan-2 | 00:50:56:bf:2c:ca | TwentyGig1/1/1 | 42 | 4.3574219 | | Downlink |
| vlan-2 | 00:50:56:bf:7d:8f | TwentyGig1/1/1 | 0 | 0 | New | Downlink |
| vlan-4 | 00:50:56:bf:73:fc | TwentyGig1/1/1 | 206 | 38.578125 | Moved | Downlink |
| vlan-4 | 00:50:56:bf:74:3e | TwentyGig1/1/1 | 0 | 0 | New | Downlink |
| vlan-5 | 00:50:56:bf:62:66 | TwentyGig1/1/1 | 49 | 7.921875 | | Downlink |
| vlan-5 | 00:50:56:bf:67:e6 | TwentyGig1/1/2 | 0 | 0 | | Downlink |
| vlan-6 | 00:50:56:bf:67:f8 | TwentyGig1/1/2 | 0 | 0 | | Downlink |
| vlan-6 | 00:50:56:bf:4e:e0 | TwentyGig1/1/2 | 0 | 0 | | Downlink |
| vlan-8 | 00:50:56:bf:21:8b | TwentyGig1/1/2 | 31 | 6.3261719 | Moved | Downlink |
| vlan-8 | 00:50:56:bf:55:96 | TwentyGig1/1/2 | 0 | 0 | | Downlink |

512 points to header row; 502, 504, 506, 508, 510 label columns.

| | | | Snapshot captured at time instance t | | | | |
|---|---|---|---|---|---|---|---|
| VLAN | Source MAC Address | Dst MAC Address | Packets Count | Traffic Volume (Kbytes) | Direction | Interfaces | State information |
| vlan-2 | 00:50:56:bf:2c:ca | 00:50:56:bf:7d:8f | 15 | 1.70214844 | Downlink<->Downlink | TwentyGigE0/1/2<->TwentyGigE0/1/1 | |
| vlan-3 | 00:50:56:bf:30:be | 00:50:56:bf:62:e9 | 67 | 56.2128906 | Downlink<->Downlink | TwentyGigE0/1/2<->TwentyGigE0/1/1 | |
| vlan-4 | 00:50:56:bf:74:3e | 00:50:56:bf:73:fc | 2414 | 3374.54688 | Downlink<->Downlink | TwentyGigE0/1/2<->TwentyGigE0/1/1 | New |
| vlan-6 | 00:50:56:bf:67:f8 | 00:50:56:bf:4e:e0 | 2662 | 3396.88086 | Downlink<->Downlink | TwentyGigE0/1/2<->TwentyGigE0/1/1 | |
| vlan-8 | 00:50:56:bf:55:96 | 00:50:56:bf:21:8b | 2410 | 3374.29688 | Downlink<->Downlink | TwentyGigE0/1/2<->TwentyGigE0/1/1 | |
| vlan-10 | 00:50:56:bf:27:3b | 01:00:5e:00:00:fb | 68 | 11.1640625 | Uplink<->Downlink | FortyGigE0/0/1<->TwentyGigE0/1/1 | |

516, 518, 520 label columns.

NETWORK INFRASTRUCTURE MANAGEMENT

BACKGROUND

A computer network may have a variety of resources which provide capabilities for computation, storage and connectivity in the computer network. Network infrastructure, comprising such resources, enables data exchange between users, devices, processes, applications, services, and networks. The network infrastructure may be managed by network administrators based on information on flow of data packets in the network infrastructure, for proper operation and connectivity in the network infrastructure.

BRIEF DESCRIPTION OF DRAWINGS

The following detailed description references the drawings, wherein:

FIG. 3A illustrates a counter association table, according to an example;

FIG. 3B illustrates another counter association table, according to an example;

FIG. 5A illustrates a table that can be included in a snapshot, according to an example;

FIG. 5B illustrates another table that can be included in the snapshot, according to an example;

DETAILED DESCRIPTION

Network statistics include information on flow of data in the form of data packets or data frames in a network infrastructure. A data packet is a formatted unit of data carried in a computer network. The data packet includes control information and payload. The control information includes data for delivering the payload, such as source and destination addresses, error detection codes, etc. The data packet refers to a protocol data unit (PDU) of the network layer in the Open System Interconnection (OSI) model. A data frame is a digital data transmission unit in a computer network. The data frame refers to a PDU of the data link layer in the OSI model. Network statistics, such as data packet counts, data traffic volume, data frame counts, broadcast packet counts, and dropped packet counts may be used for monitoring the network infrastructure to obtain patterns of network behavior and thereby enabling deployment and configuration of resources, such as servers, storage, and networking components in the network infrastructure. Analysis of network statistics may provide patterns of workload movement, bandwidth usage, load on broadcast domains, direction of data traffic, etc. in the network infrastructure.

In a network infrastructure, the network statistics are generally extracted by employing Deep Packet Inspection (DPI) and sampled data flow analysis on data packets passing through a networking component. A networking component includes a device that has data storage, data routing, and data forwarding capabilities. Examples of the networking component includes, network switches, routers, hubs, gateways, interconnect modules (ICMs), or the like. In some general techniques, data packets may be sampled and information relating to flow of the sampled data packets may be sent to a remote station, such as a server, which may parse and process the information to provide the network statistics. Sampling the data packets, parsing the information relating to flow of the sampled data packets and processing the parsed information may involve complex data processing to be performed on the data packets. The complexity of the data processing operations performed on the data packets may increase with increased data traffic volume in the networking component. In addition, since the data packets are sent to the remote station for analysis, additional network bandwidth may be consumed for determining the network statistics by employing these techniques.

In the present subject matter, network statistics attributes may be determined in a network device, such as a switch or an interconnect module (ICM), without sending the information relating to flow of the data packets to a remote station, such as a server. This may eliminate consumption of additional network bandwidth for determining the network statistics attributes. Further, in the present subject matter, complex data processing associated with sampling and parsing of data packets, as in some general techniques, may be eliminated.

Example implementations of the present subject matter for managing a network infrastructure based on network statistics are described. In an example, a network statistics request from a computing device is received by a processor of a network device in the network infrastructure. The computing device may be a computer that processes data for managing the network infrastructure and the network device may be a network switch or an ICM. The network statistics request indicates at least one of a node and a data path, in a layer of a network stack in the network infrastructure, for which a network statistics attribute is to be determined. A node is a connection point in a computer network that can receive, create, store or send data along distributed routes in the computer network. The node may be a redistribution point or a communication endpoint. A data path may be a connected route between a source node and a destination node, where data packets originate from the source node to be communicated to the destination node. In an example, the data path may be identified by an address of the source node and an address of the destination node. The layer refers to an abstraction layer in the network stack or protocol stack implemented in the network infrastructure. Examples of the layer include a datalink layer, a network layer, and a transport layer of the Open System Interconnections (OSI) model. In an example, in the context of the datalink layer, a node may be an electronic device, such as a network interface card, having a physical address, such as a Media Access Control (MAC) address, in a Virtual Local Area Network (VLAN).

The network statistics attribute represents information associated with one of data packets transceived by the node and data packets transferred over the data path. Transceiving of data packets refers to transmission and/or reception of data packets by the node or over the data path. Examples of network statistics attributes include transceived data packets, transceived packet volume, and transceived data frames. A value of a counter associated with the network statistics attribute of the node or the data path is updated based on one of a data packet being transceived by the node or a data packet being transferred over the data path. A counter associated with a network statistics attribute of a node or a data path may store a numerical value which gives a quantitative measure of the network statistics attribute relevant to the node or the data path. In an example, a counter may be associated with a network statistics attribute that indicates a transceived data packet count of a node. In the example, on receipt or transmit of a data packet by the node, the value stored in the counter may be incremented. In another example, a counter may be associated with a network statistics attribute that indicates a transceived data packet count of a data path. In the other example, when a data packet transits over the data path, the value stored in the counter may be incremented. Thus, the network statistics attribute is determined based on the value of the counter and is provided to the computing device.

In an example, the computing device may implement a network infrastructure management platform which includes applications and processes that can configure, monitor, and provide management, monitoring and configuration services to, all layers of the network stack and components of different network devices. The network statistics attribute may be provided to the network infrastructure management platform. In an example, the network infrastructure management platform may be a converged infrastructure platform.

Since, in the present subject matter, the network statistics attribute is determined based on counter values updated on transmit and/or receive of a data packet at the node or transit of a data packet in the data path, therefore the network statistics attribute is not based on sampled data, as in some general techniques. Hence, a continuous pattern of workload movements, bandwidth usage, direction of data traffic, etc., may be obtained upon analysis of the network statistics attribute(s). Further, in the present subject matter, since the data packets are not sampled and parsed, the data packet processing may be simpler.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
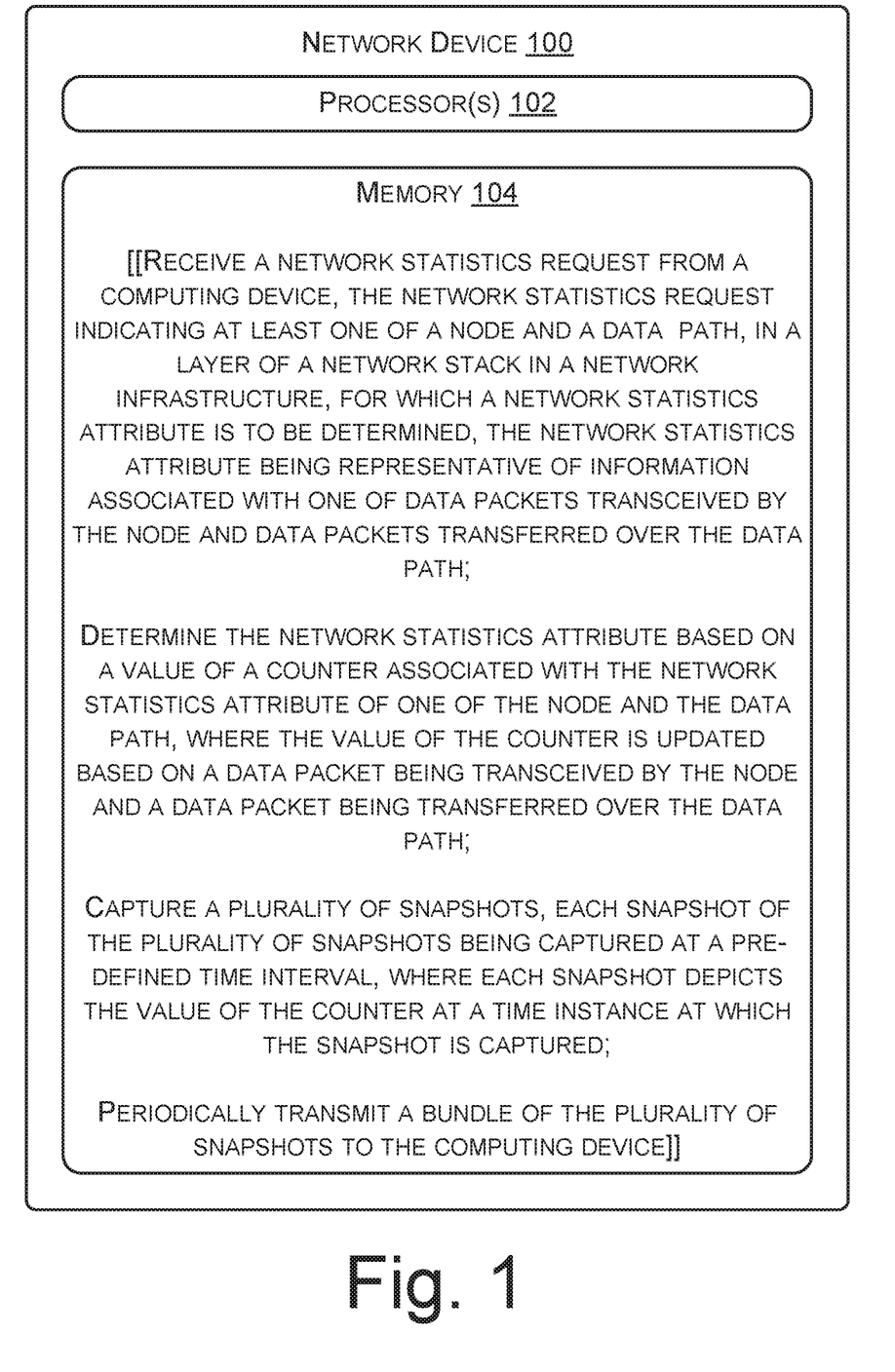
FIG. 1 illustrates a network device for managing the network infrastructure, according to an example.

FIG. 1 illustrates a network device 100 for managing the network infrastructure, according to an example. The network device 100 may be a network switch. In an example, the network device 100 may have networking capabilities to connect one or more servers to datacenter networks. In some examples, the network device 100 may be an ICM connecting blade servers in an enclosure to datacenter networks. Other examples of the network device 100 includes a top of rack switch, a middle of rack switch, an end of row switch, a middle of row switch, a spine switch, an edge switch, an aggregation switch, a core switch, and a router.

The network device 100 includes a processor 102 and a memory 104 coupled to the processor 102. The memory 104 stores instructions executable by the processor 102. The instructions when executed by the processor 102 cause the processor 102 to receive a network statistics request from a computing device (not shown). In some examples, the computing device may implement an infrastructure management platform which can provide reports depicting patterns of bandwidth usage, workload movement, data traffic direction, etc., based on network statistics sourced from the network device 100, for managing the network infrastructure. In an example, the computing device may implement a network infrastructure management platform which may generate the network statistics request based on a user input in the network infrastructure management platform. In an example, the network infrastructure management platform may be a converged infrastructure platform.

The network statistics request may indicate at least one of a node and a data path, in a layer of a network stack in the network infrastructure, for which a network statistics attribute is to be determined. The network stack (also called protocol stack) refers to an implementation of a computer networking protocol suite. Individual protocols within a protocol suite are often directed to perform separate types of functions. Thus, each protocol in the protocol stack may be considered as an abstraction layer (or a layer) in a stack of protocols. Every layer adds more features and capability to the protocol suite. For example, in the Open Systems Interconnection (OSI) model, there are seven layers, such as datalink layer, network layer, transport layer, etc. The network statistics request may indicate a node or a data path corresponding to any of the layers and a network statistics attribute to be determined for the indicated node or data path.

The node is a connection point that can receive, create, store or send data along distributed routes in a computer network. The node may be a redistribution point or a communication endpoint. In an example, in the context of the datalink layer (layer 2) of the OSI model, a node may be an electronic device, such as a network interface card, having a physical address, such as a Media Access Control (MAC) address, in a Virtual Local Area Network (VLAN). In another example, in the context of the network layer (layer 3) of the OSI model, a node may be an electronic device, such as a computer, a router, and a switch, having a logical address, such as an Internet Protocol (IP) address in a Transmission Control Protocol (TCP)/IP network. In another example, in the context of the transport layer (layer 4) of the OSI model, a node may be a logical port having a TCP/User Datagram Protocol (UDP) port number. In an example, a node may be specified in the network statistics request by mentioning a broadcast domain under which the node is grouped and a unique identifier, such as a MAC address, an IP address, or a TCP/UDP port number.

A data path may be a connected route between a source node and a destination node, where data packets originate from the source node to be communicated to the destination node. In an example, the data path may be identified by an address of the source node and an address of the destination node. In an example, a data path may be specified in the network statistics request by mentioning an address of the source node and an address of the destination node and a subnetwork under which the source and destination node is grouped.

The network statistics attribute is representative of information associated with one of data packets transceived by the node and data packets transferred over the data path. Examples of the network statistics attribute of a node and a data path include: transceived data packets indicating a total number of data packets either transmitted or received by the node or transferred over the data path, transceived traffic volume indicating total bytes of data either transmitted or received by the node or transferred over the data path, and transceived data frames indicating a total number of data frames either transmitted or received by the node or transferred over the data path.

Other examples of the network statistics attributes for a node include Tx packets, Rx packets, Tx jumbo frames, Rx jumbo frames, Tx traffic volume, Rx traffic volume, broadcast Tx, broadcast Rx, multicast Tx, multicast Rx, dropped Tx, dropped Rx, Internet Small Computer System Interface (ISCSI) Tx packets, and ISCSI Rx packets. Tx packets and Rx packets indicate a number of data packets transmitted or received by the node. Tx jumbo frames and Rx jumbo frames indicate a number of jumbo frames transmitted or received by the node. Tx traffic volume and Rx traffic volume indicate bytes of data transmitted or received by the node. Dropped Tx indicate number of data packets transmitted by the node which are dropped in transit and dropped Rx indicating number of data packets destined to reach the node which are dropped in transit. Broadcast Tx and broadcast Rx indicate a number of broadcast data packets transmitted or received by the node. Multicast Tx and multicast Rx indicate a number of multicast data packets transmitted or received by the node. ISCSI Tx packets and ISCSI Rx packets indicate the number of data packets transmitted or received by the node using the ISCSI protocol. Similar examples of network statistic attributes may be applicable for the data path.

On receiving the network statistics request, the network statistics attribute is determined based on a value of a counter associated with the network statistics attribute of one of the node and the data path. The counter associated with a network statistics attribute of a node or a data path can store a numerical value which gives a quantitative measure of the network statistics attribute. The value of the counter is updated based on a data packet being transceived by the node or a data packet being transferred over the data path. In an example, updating the value of the counter may include incrementing the value of the counter when a data packet is transmitted or received by the node or transferred over the data path.

In an example, the counter includes a transceived data packet counter which stores a numerical value indicative of one of a number of data packets transceived by the node and a number of data packets transferred over the data path. In another example, the counter includes a transceived traffic volume counter which stores a numerical value in bytes indicative of a total size of one of data packets transceived by the node and data packets transferred over the data path. Other examples of the counter include Tx jumbo frames counter, Rx jumbo frames counter, Tx traffic volume counter, Rx traffic volume counter, broadcast Tx counter, broadcast Rx counter, multicast Tx counter, multicast Rx counter. Each of these counters are associated with corresponding network statistics attributes described earlier.

A plurality of snapshots are captured, where each snapshot of the plurality of snapshots are captured at a predefined time interval. Each of the snapshots depicts the value of the counter at a time instance at which the snapshot is captured. A bundle or collection of the plurality of snapshots are periodically transmitted to the computing device. In an example, on receiving a request from the computing device for accessing the snapshots, the network device 100 may transmit the snapshots to the computing device, or enable the computing device to obtain the snapshots stored in the network device 100.

In an example, the plurality of snapshots may be sent to an infrastructure management platform of the network device which can analyze the snapshots to obtain patterns on usage of the network infrastructure based on the network statistics attribute. The infrastructure management platform may generate reports based on the patterns which may enable a network administrator to manage the network infrastructure.

Since, in the present subject matter, data processing for determining the network statistics attribute(s) is performed within the network device, instead of the data processing being performed at a remote station, therefore the bandwidth consumption to transceive information related to network statistics, between the network device and the remote platform, may be eliminated. Also, the data processing to determine the network statistics may be simpler since the present subject matter does not involve sampling and parsing of the data packets. Additionally, since the network statistics attribute may be determined for a node or data path corresponding to each layer of the network stack, as indicated in the network statistics request, therefore, network statistics reports based on the network statistics attribute may be obtained in a layered and modular manner, which may provide a simplified view of the network infrastructure.

Figure 2:
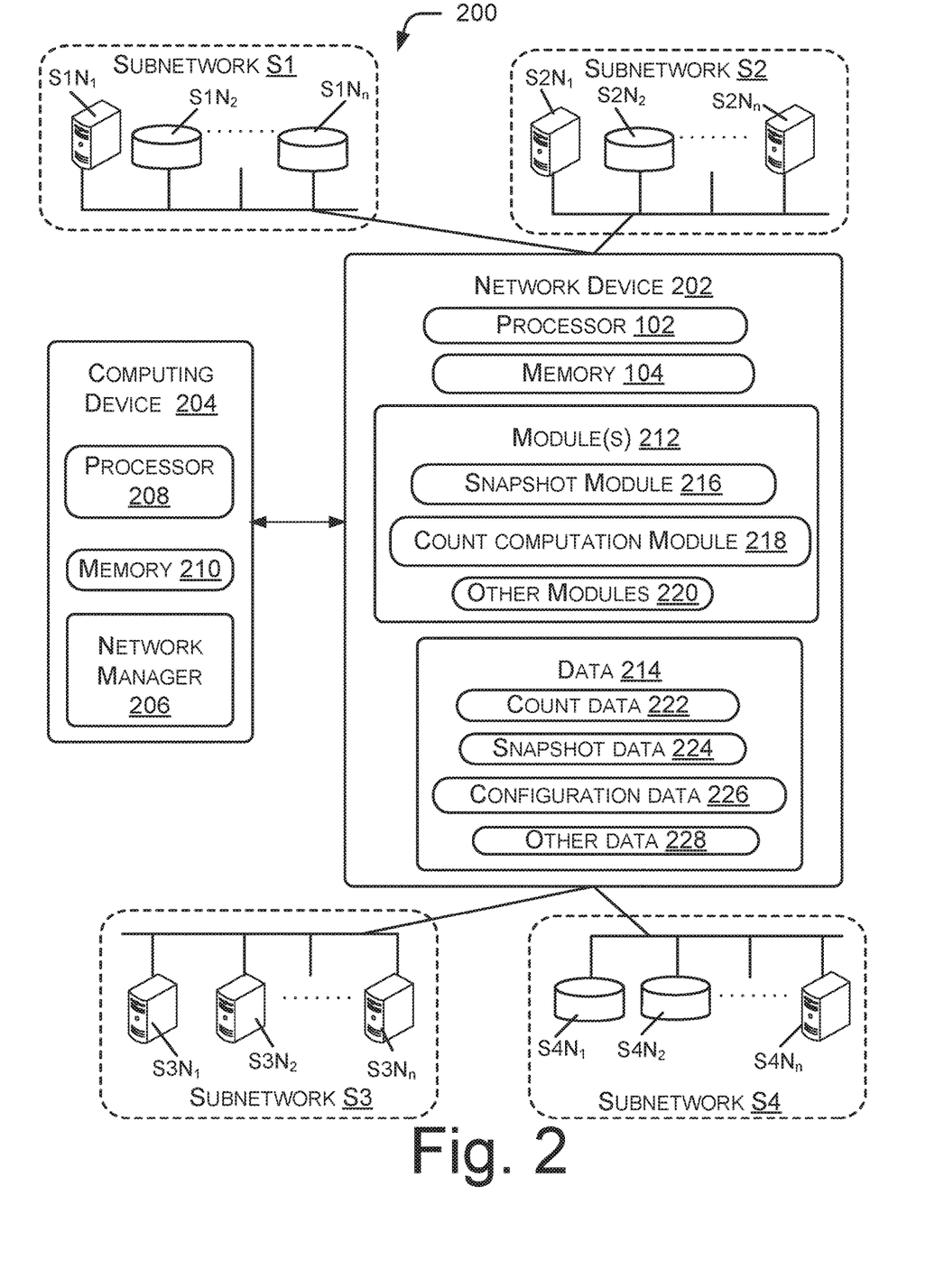
FIG. 2 illustrates a network infrastructure managed by the network device, according to an example.

FIG. 2 illustrates a network infrastructure 200 managed by a network device 202, according to an example of the present subject matter. The network infrastructure 200 may include network attachable devices, such as, servers, storage devices, switches, routers, hubs, gateways, interconnects, laptops, desktops, wireless endpoints, printers, network sockets and physical and logical ports for transfer of data over the network infrastructure 200. In an example, the network device 202 may be a network switch or an ICM that enables connection between servers as part of a data center network, or between servers and storage systems as part of storage specific Storage Area Networks (SANs).

The network device 202 is coupled to a computing device 204 over the network infrastructure 200. In an example, the computing device 204 may be a computer which is used to manage the network infrastructure 200. The computing device 204 includes a network manager 206, which, in an example, may implement a converged infrastructure management platform. In an example, the converged infrastructure management platform may create a logical interconnect group to manage the network infrastructure 200. A logical interconnect group is a representation of an entity that includes configuration of one ICM or multiple ICMs in an enclosure.

As shown in FIG. 2, the network infrastructure 200 may include subnetworks, S1, S2, S3, and S4. A subnetwork may be a logical division of a computer network, in which all nodes can communicate with each other. In an example, a subnetwork may be a VLAN in the context of layer 2 or an IP subnet in the context of layer 3. The subnetwork S1 includes nodes $S1N_1, S1N_2, \ldots, S1N_n$, the subnetwork S2 includes nodes $S2N_1, S2N_2, \ldots, S2N_n$, the subnetwork S3 includes nodes $S3N_1, S3N_2, \ldots, S3N_n$, and the subnetwork S4 includes nodes $S4N_1, S4N_2, \ldots, S4N_n$. The network device 202 may enable connectivity between the nodes in the subnetworks S1 to S4. With the network device and method(s) of the present subject matter, network statistics attribute(s) may be determined for any of such nodes as shown in FIG. 2. The network statistics attribute(s) may also be determined for any data path between two nodes. Although, in FIG. 2, four subnetworks are shown, there may be more than four or less than four subnetworks. As shown in FIG. 2, the network device 202 enables connectivity between servers and storage systems or storage devices as part of storage specific storage area networks (SANs). In some other examples, the network device 202 may also enable connectivity between other devices such as laptops, desktops, printers, wireless access points, etc., although not shown in FIG. 2. Further, although, the network infrastructure 200 is shown to include a single network device, in an example, there may be multiple network devices present in the network infrastructure 200.

The network device 202 includes the processor 102 coupled to a memory 104. The computing device 204 includes a processor 208 coupled to a memory 210. The processor(s) 102 and 208 may be implemented as microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions stored in the memory 104. The processor 208 is configured to fetch and execute computer-readable instructions stored in the memory 210.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The memories 104 and 210 may include any computer-readable medium known in the art including, for example, volatile memory (e.g., RAM), and/or non-volatile memory (e.g., EPROM, flash memory, etc.). Modules 212 and data 214 may reside in the memory 104. The modules 212 can be implemented as instructions stored on a computer readable medium and executable by a processor and/or as hardware. The modules 212 include routines, programs, components, data structures, and the like, which perform particular tasks or implement particular abstract data types.

The modules 212 include a snapshot module 216 which corresponds to instructions stored on a computer readable medium and executable by a processor to capture, process, and operate on snapshots. The modules 212 include a count computation module 218 which corresponds to instructions stored on a computer readable medium and executable by a processor to associate counters with a node or a data path, update counter values, process counter values, etc. The modules 212 also comprise other modules 220 that supplement applications on the network device 202, for example, modules of an operating system.

The data 214 serves, amongst other things, as a repository for storing data that may be fetched, processed, received, or generated by the modules 212. The data 214 includes count data 222 which stores values of counters corresponding to network statistics attributes for nodes and data paths, snapshot data 224 which stores snapshots of the count data 222, and configuration data 226 which includes unique identifiers corresponding to the nodes and data paths for which network statistics attributes are determined. The data 214 also comprises other data 228 corresponding to the other modules 220.

In operation, a network statistics request may be received by the network device 202 from the computing device 204. In an example, the network statistics request may be generated on user inputs being received by the network manager 206, which may implement an infrastructure management platform. In an example, the network statistics request may indicate a node and/or a data path for which a network statistics attribute is to be determined. The node and/or the data path for which the network statistics attribute is to be determined, may be provided by the user inputs.

In some examples, the network statistics request may indicate multiple nodes or data paths and multiple network statistics attributes to be determined for the indicated nodes or data paths. The network statistics request may indicate a node of a subnetwork, such as an endpoint of a VLAN, or a host of an IP subnet, for which network statistics attributes are to be determined. In an example, the network statistics request may indicate a specific MAC address identifying an endpoint grouped under a specific VLAN ID for which the network statistics attributes are to be determined. In some examples, the network statistics request may indicate all the endpoints grouped under a specific VLAN ID for which the network statistics attributes are to be determined. In other examples, the network statistics request may indicate a specific IP address identifying a host of a specific IP subnet for which the network statistics attributes are to be determined. In some examples, the network statistics request may indicate a specific TCP/UDP port identified through its port number mapped under a specific IP subnet for which the network statistics attributes are to be determined.

In some examples, a data path may be specified in the network statistics request by mentioning an address of the source node and an address of the destination node and a subnetwork to which the source and destination node belongs. A subnetwork may be a logical division of a computer network, in which all nodes can communicate with each other. In an example, a subnet may be an IPv4 or IPv6 subnet address for a layer 3 network data path. The nodes and the data paths and the corresponding network statistics attributes to be determined may vary depending on layers of a protocol stack in the network infrastructure. In an example, the network statistics request may also indicate a time duration for which the node or the data path is to be monitored for determining values of the network statistics attributes.

Network statistics attributes may represent information associated with flow of data packets at the node and/or the data path. Examples of the network statistics attributes for a node include Tx packets, Rx packets, Tx jumbo frames, Rx jumbo frames, Tx traffic volume, Rx traffic volume, broadcast Tx, broadcast Rx, multicast Tx, multicast Rx, dropped Tx, dropped Rx, Internet Small Computer System Interface (ISCSI) Tx packets, and ISCSI Rx packets.

When the network statistics request indicates multiple nodes and multiple network statistics attributes to be determined for those nodes, the count computation module 218 may associate a respective counter with each of the network statistics attributes of each node. The association of the respective counters with each of the network statistics attributes of each node may be depicted in a counter association table 300, as illustrated in FIG. 3A. The counter association table, may be stored as a part of a control plane or management plane of the network device 202. The control plane includes the architecture of the network device 202 that performs the functions related to determining the route of data packets passing through the network device 202. The management plane refers to architecture within the network device 202 that configures, monitors, and provides management, monitoring and configuration services to, all layers of the network stack and other components of the network device 202. As shown in FIG. 3A, columns 302 and 304, provide identification of the nodes for which network statistics attributes are to be determined. Column 302 lists out the VLANs and column 304 provides MAC addresses of specific endpoints in respective VLANs for which the network statistics attributes are to be determined. In an example, the MAC addresses may be either a source MAC address or a destination MAC address, as may be specified in the network statistics request. In column 304, where the MAC address is depicted as "ALL", it signifies that the network statistics attributes are to be determined for all the endpoints in the corresponding VLAN.

Columns 306 and 308 correspond to network statistics attributes that are to be determined. The values in the cells of columns 306 and 308 represent flag values based on which the count computation module 218 decides whether or not to compute values of the counter associated with the network statistics attribute. Computation of a value of a counter includes the count computation module 218 modifying the value of the counter based on occurrence of an event. In an example, when a MAC address and VLAN ID of a data packet received at the network device 202, match with the MAC address and VLAN ID of a node for which the network statistics attribute(s) is to be determined, then the count computation module 218 determines the occurrence of the event. On determining the occurrence of the event, the count computation module 218 may apply specific set of rules to update the values of counters associated with the network statistics attribute(s), such as Rx jumbo frames counter, Rx traffic volume counter, etc., for the node.

With reference to row 310, the flag values corresponding to "packet count" and "traffic volume" is "compute". This indicates that both "packet count" and "traffic volume" counters are to be computed for all the endpoints in VLAN 2. With reference to row 312, the flag values corresponding to "packet count" and "traffic volume" is "none" and "compute", respectively. This indicates that, for the MAC address 00:50:56:bf:21:8b, a counter for "traffic volume" is to be computed and a counter for "packet count" is not computed. The flag values in the counter association table may be determined based on the network statistics request indicating which of the network statistics attributes are to be determined.

Another example counter association table 330 is depicted in FIG. 3B. The count computation module 218 may generate the counter association table 330 based on a network statistics request for determining network statistics attributes for one data path or more than one data paths. Each data path in table 330 is represented by a corresponding source node, a destination node, and a VLAN under which they are grouped. Columns 316 and 318 identify the source and destination nodes of the data path and column 314 identifies the VLAN ID under which the source and destination nodes are grouped. The network statistics attributes which are to be determined for all the data paths are the "packet counts" and "traffic volume" which contains the flag values as "compute", as depicted in columns 320 and 322, respectively.

Once counters are associated with the network statistics attributes per node and/or per data path, the count computation module 218 may update values of the counters based on a data packet being transceived by the node or a data packet being transferred over the data path. In an example, the values of the counters corresponding to each of the network statistics attributes per node or per data path may be stored in tables of a data plane of the network device 202. The data plane refers to an architecture of the network device 202 that has the capability of forwarding data packets based on route information obtained from the control plane. The network statistics attributes for each node or data path may be determined based on the value of the respective counters.

Figure 4A:
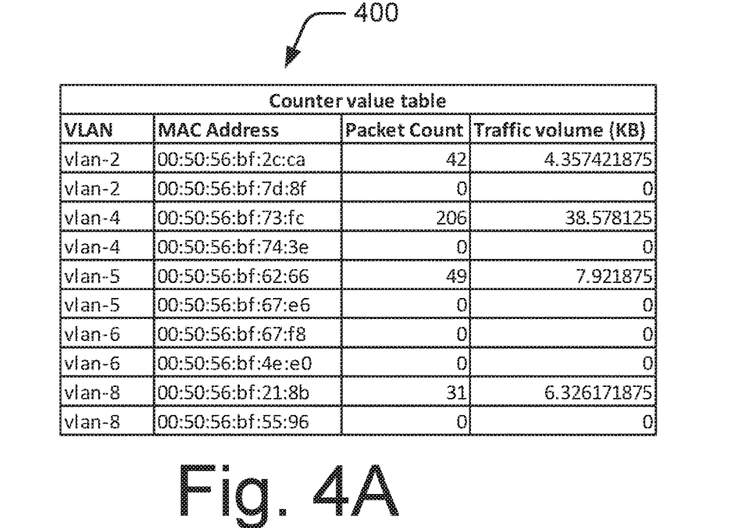
FIG. 4A illustrates a counter value table, according to an example.
Figure 4B:
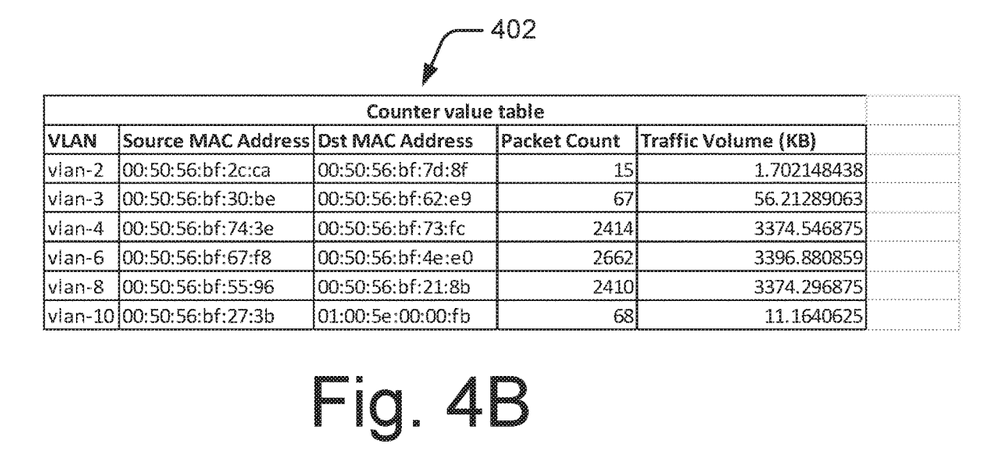
FIG. 4B illustrates another counter value table, according to an example.

Example of a counter value table 400 is depicted in FIG. 4A. The counter value table 400 of FIG. 4A depicts the values of the counters updated for a pre-defined time duration as may be indicated in the network statistics request. The counter value table 400 of FIG. 4A may be obtained upon computation of the counter values in the counter association table 300, as depicted in FIG. 3A. Another example counter value table 402 is illustrated in FIG. 4B. The counter value table 402 of FIG. 4B may be obtained upon computation of the counter values in the counter association table 330, as depicted in FIG. 3B. In an example, the values of the counters for the network statistics attributes "Packet count" and "Traffic volume", may be stored as a part of the count data 222.

The snapshot module 216 may capture a plurality of snapshots, where each snapshot is captured at a pre-defined time interval. In an example, the snapshots may be captured in a time interval of 10 milliseconds. Capturing the snapshots at the pre-defined time interval may continue for the time duration for which the network statistics attributes are to be monitored for the node or the data path. Each snapshot depicts the value of a counter associated with a network statistics attribute of a node or data path, at a time instance at which the snapshot is captured. In an example, the snapshots may be captured on occurrence of a particular event at the node, say, when a number of the received data packets reaches a predefined threshold. In another example, the snapshots may be captured on occurrence of a particular event at the data path, say, when data traffic volume over the data path reaches a predefined threshold.

In an example, based on the value of the counter depicted by each snapshot, a state information of the node or a node in the data path may be determined. The state information is indicative of workload movements in the network infrastructure 200. Workloads may refer to Virtual Machines (VMs) associated with the node being monitored or with any node in the data path being monitored. The state information may be determined upon analysis of the snapshot at the control plane or the management plane of the network device 202. The state information may be indicative of creation or deletion of new VMs in the nodes of the network infrastructure 200 and may be estimated based on the determined network statistics attributes.

Further, in an example, metadata information may be associated with each snapshot. The metadata information includes at least one of a timestamp denoting the time instance at which the snapshot is being captured, the state information at the time instance, and configuration information relating to resources for which the network statistics attribute is determined. The configuration information may include unique identifiers of nodes or data paths for which the network statistics attributes are determined, direction of traffic flow, interface information, and protocol information. In some examples, the configuration information may be extracted from the network statistics request. In an example, with reference to FIG. 3A, the data in columns 302 and 304 may represent the configuration information and with reference to FIG. 3B, the data in columns 314-318 may represent the configuration information. The configuration information may be stored as part of the configuration data 226.

Figure 5C:
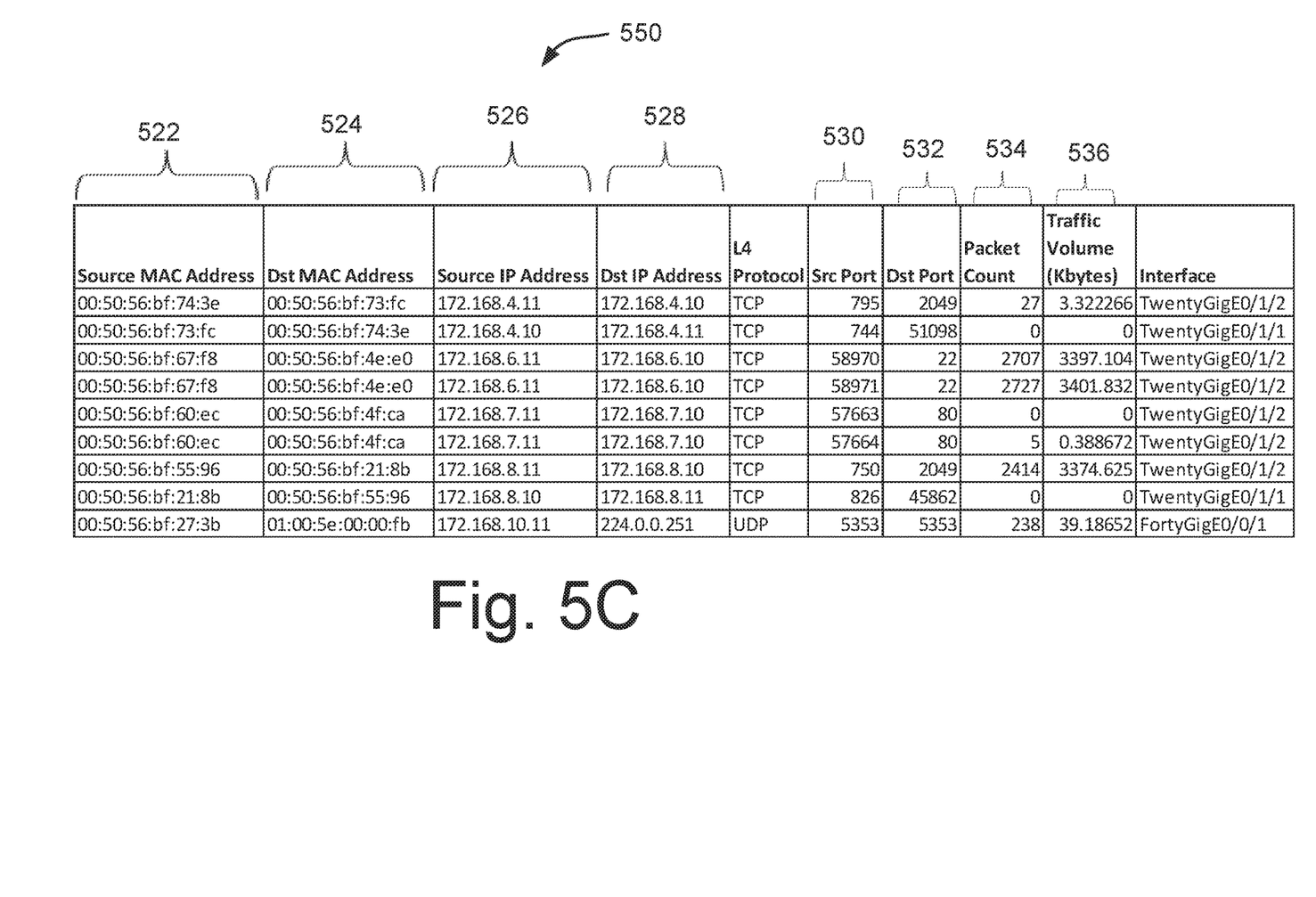
FIG. 5C illustrates another table that can be included in the snapshot, according to an example.

FIGS. 5A-5C illustrate example tables that may be included in a snapshot captured at a particular time instance. Values of counters associated with respective network statistics attributes corresponding to a node or a data path are included in the snapshot.

With reference to FIG. 5A, the table 500 includes the counter value table 400 depicted in FIG. 4A. Columns 502 and 504 correspond to unique identifiers for the nodes for which the network statistics attributes are determined. As shown, column 504 depicts the MAC addresses of the nodes and column 502 depicts the VLAN id under which a respective node is grouped. Column 506 depicts the interface corresponding to each node. In an example, the interface provides information about the component or medium that allows interaction between the network device 202 and the node. Information relating to the interface may be included in the metadata information of the snapshot.

Column 508 depicts the state information corresponding to each node. The state information, "New" signifies that a new VM is being created at the respective node. The state information, "Moved" signifies that a new VM is being moved to the respective node. Column 510 depicts the port information corresponding to each node. The port information identifies the type of physical port used for data packet transfer at the respective nodes. In an example, the ports may be uplink ports or downlink ports of an ICM. The state information and the port information may be obtained by analyzing the network statistics attributes, such as the packet counts, at the control plane or the management plane of the network device 202. The state information and the port information may be associated with the snapshot, as illustrated in FIG. 5A. The table 500 may also include the metadata information of a time stamp when the snapshot is captured, as denoted in row 512.

With reference to FIG. 5B, a table 525 includes the counter value table 402 depicted in FIG. 4B. The column 516 denotes the direction of data traffic flow. For example, the direction "Downlink↔Downlink" signifies flow of data traffic in east-west direction of a switch or an ICM. The direction "Uplink↔Downlink" signifies flow of data traffic in north-south direction of a switch or an ICM. In an example, the direction of the flow of data packets may be indicated in the network statistics request for determining the network statistics attributes. The column 518 denotes interfaces involved at the source and destination nodes of the data path. The "direction" and "interfaces" may form a part of the configuration information included in the metadata information and associated with the snapshot. In an example, data in columns 516 and 518 may be stored as part of the configuration data 226. The column 520 denotes the state information relating to creation of VMs in either the source or the destination node of the data path.

FIG. 5C illustrates a table 550 indicating values of counters associated with respective network statistics attributes for a collection of data paths indicated by their respective source and destination IP addresses. Columns 522, 524, 526, 528, 530, and 532 indicate the data path for which the network statistics attributes are determined. Columns 522, 524 indicate the source and destination endpoints of VLANs, columns 526 and 528 indicate the source and destination IP addresses, and columns 530 and 532 indicate the source and destination TCP/UDP port addresses, respectively, for which the network statistics attributes are determined. The values of the columns 522 to 532 may be populated based on network statistics request(s) which provide a list of IP subnets and a list of TCP/UDP ports for which the network statistics attributes are to be determined. The table 550 illustrated in FIG. 5C may be obtained based on counter association tables and counter value tables similar to those illustrated in FIGS. 3A, 3B and FIGS. 4A, 4B, respectively. The columns 534 and 536 depict the values of the network statistics attributes, viz., the packets count and the traffic volume, respectively, for each of the data paths.

Although in the FIGS. 3A, 3B, 4A, 4B, and 5A-5C, only two network statistics attributes are depicted, less than two or more than two network statistics attributes may be determined. Further, other network statistics attributes, such as broadcast Tx, multicast Rx, dropped Rx, may also be determined for the multiple nodes or multiple data paths.

Once, the snapshots are captured, the snapshot module 216 may periodically transmit a bundle of the captured snapshots to the computing device 204. In an example, the metadata information associated with the snapshot(s) is also provided to the computing device 204 for further processing. In an example, a rate at which the snapshots are captured is greater than the rate at which the snapshots are transmitted to the computing device 204. Thus, a bundle of snapshots may get accumulated for a time period and then they may be transmitted to the computing device 204. The network manager 206 in the computing device 204 may analyze and process the received snapshots to provide patterns of network usage. In another example, the snapshots may be processed within the network device 202, to obtain patterns of network usage and then the patterns may be forwarded to the network manager 206 in the computing device 204.

In some examples, the snapshots and the associated metadata information may be stored in the network device 202. In an example, applications of a management plane of the network device 202 may analyze and process the stored snapshots. The management plane refers to architecture within the network device 202 that configures, monitors, and provides management, monitoring and configuration services to all layers of the network stack and other components of the network device 202. In some examples, data from several network devices may be stored and processed in the management plane against application requests. In some examples, the analysis of the snapshots, may be based on the configuration information and the metadata information associated with the snapshots. Also, the management plane may determine patterns of network behavior, bandwidth consumption, and workload movements, by analyzing counter values, configuration information, and metadata information, embedded in the snapshots. In some examples, by analyzing and/or comparing the data of multiple snapshots captured over a period of time, the patterns may be determined.

Figure 6:
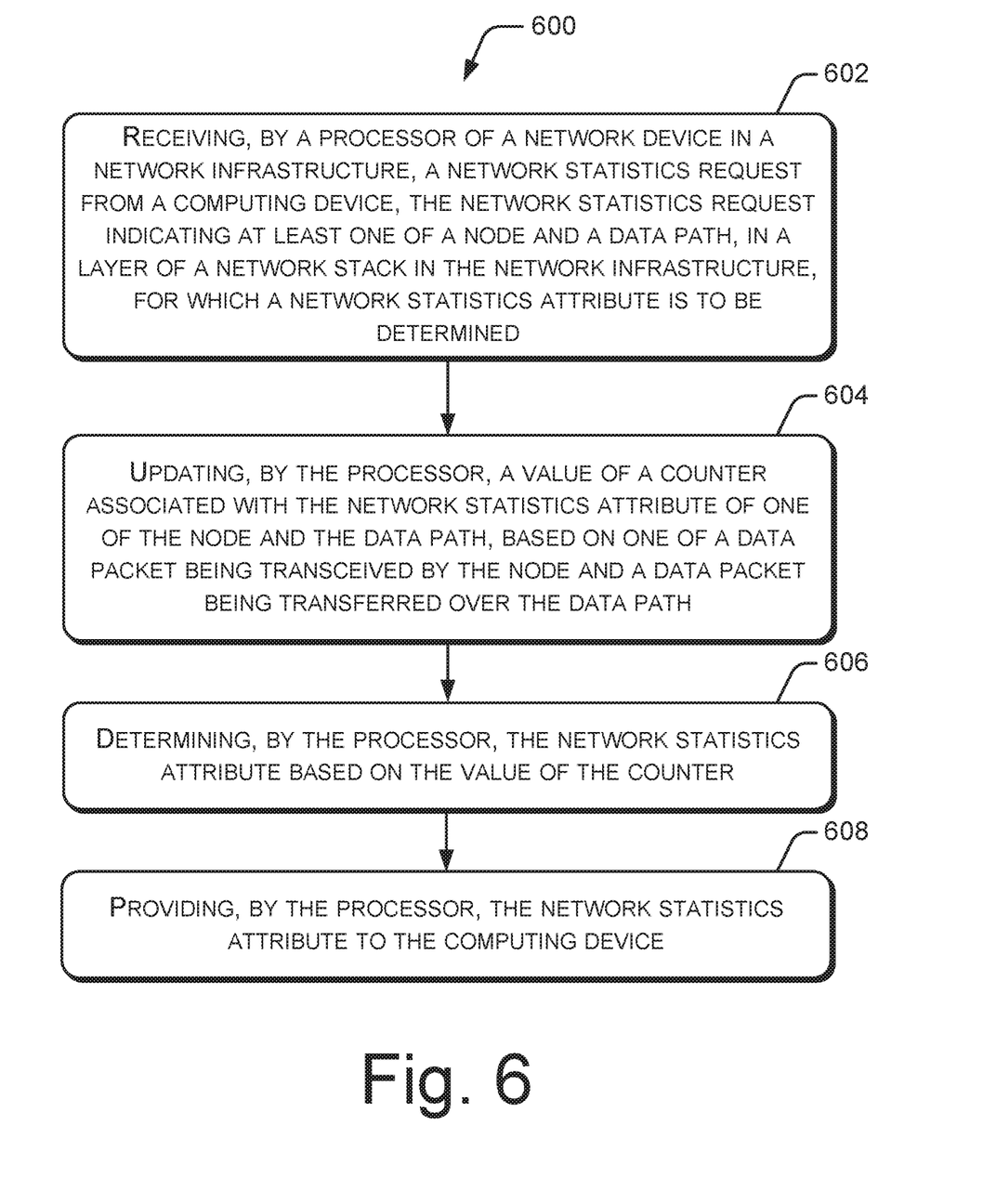
FIG. 6 illustrates a method for managing a network infrastructure, according to an example.

FIG. 6 illustrates a method 600 for managing a network infrastructure, according to an example. The method 600 can be implemented by processing resource(s) or computing device(s) through any suitable hardware, a non-transitory machine readable medium, or combination thereof. In an example, some steps of the method 600 may be performed by a count computation module, such as the count computation module 218 which includes instructions stored on a medium and executable by a processing resource, such as the processor 102, of a network device, such as the network device 100 or 202. Further, although the method 600 is described in context of the aforementioned network device 100 or 202, other suitable systems may be used for execution of the method 600. It may be understood that processes involved in the method 600 can be executed based on instructions stored in a non-transitory computer readable medium. The non-transitory computer readable medium may include, for example, digital memories, magnetic storage media, such as magnetic disks and magnetic tapes, hard drives, or optically readable digital data storage media.

Referring to FIG. 6, at block 602, a network statistics request is received by a processor of a network device in the network infrastructure from a computing device. The network device may be similar to the network device 100 or 202. The computing device may be similar to the computing device 204. The network statistics request indicates at least one of a node and a data path, in a layer of network stack in the network infrastructure, for which a network statistics attribute is to be determined. A node is a connection point in a computer network that can receive, create, store or send data along distributed routes in the computer network. A data path may be a connected route between a source node and a destination node. The layer refers to an abstraction layer in the network stack or protocol stack implemented in the network infrastructure. Examples of the layer include a datalink layer, a network layer, and a transport layer of the Open System Interconnections (OSI) model. In an example, the network statistics request may be generated based on a user input in a network infrastructure management platform implemented in the computing device.

The network statistics attribute is representative of information associated with one of data packets transceived by the node and data packets transferred over the data path. Examples of network statistics attribute includes received data packets, transmitted data packets, broadcast data packets received, multicast data packets received, dropped data packets, number of jumbo frames received, etc.

At block 604, a value of a counter associated with the network statistics attribute of one of the node and the data path is updated, based on one of a data packet being transceived by the node and a data packet being transferred over the data path. The counter may hold a numerical value which may be updated on data packets being transceived. In an example, the counter is a transceived data packet counter which stores the value indicative of one of a number of data packets transceived by the node and a number of data packets transferred over the data path. In another example, the counter is a transceived traffic volume counter which stores a value indicative of a total size of one of data packets transceived by the node and data packets transferred over the data path.

At block 606, the network statistics attribute is determined based on the value of the counter. At block 608, the network statistics attribute is provided to the computing device. The network statistics attribute may be analyzed at the computing device to obtain patterns of network behavior of the network infrastructure. Although, in the description above, a single network statistics attribute is determined for a node or data path, multiple network statistics attributes may be determined per node or data path. Also, such network statistics attributes may be determined for multiple nodes or multiple data paths. The nodes or data paths may also correspond to different layers of the network stack.

Figure 7:
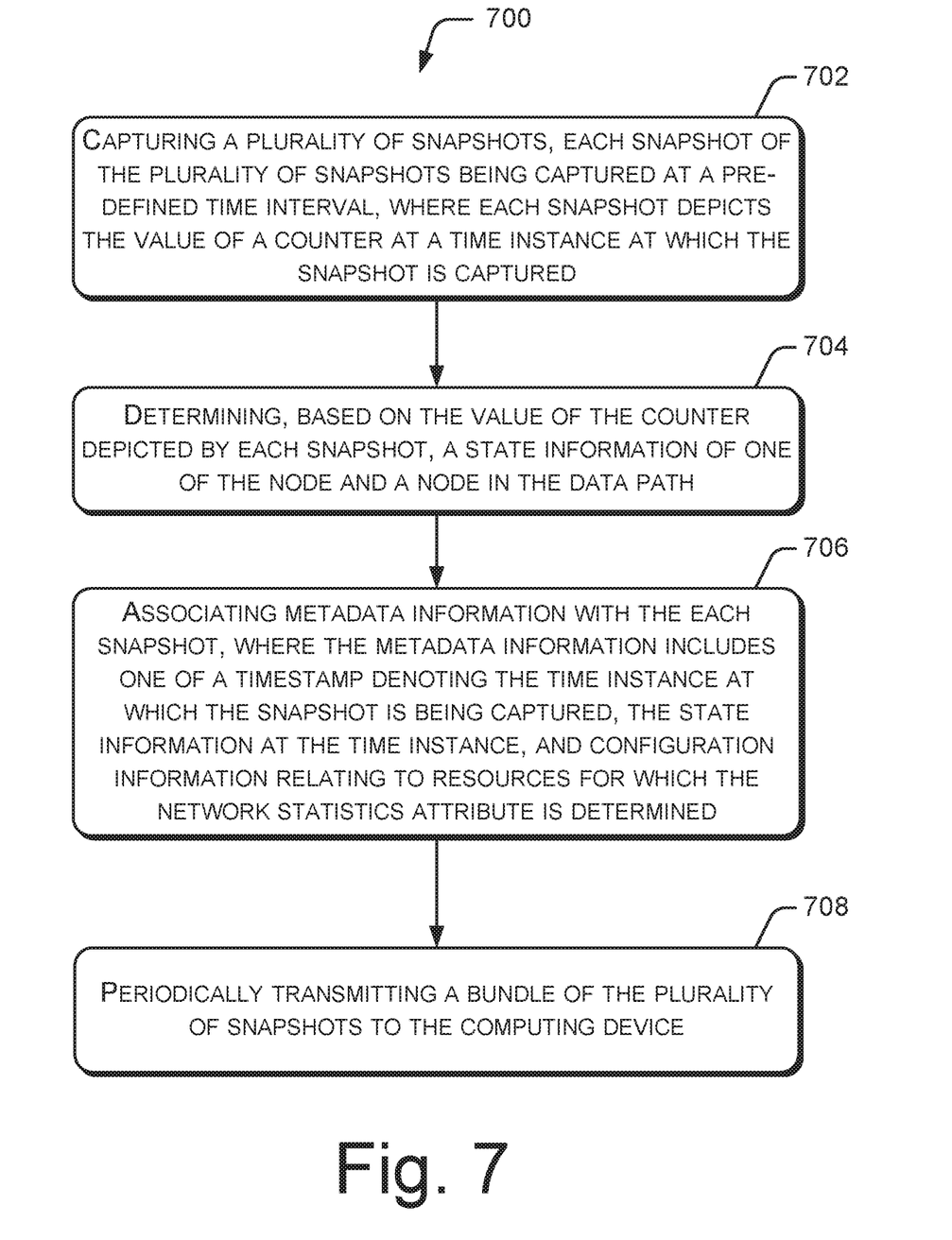
FIG. 7 illustrates a method for providing the network statistics attribute to a computing device, according to an example.

FIG. 7 illustrates a method 700 for providing the network statistics attribute to the computing device, according to an example. In an example, steps of the method 700 may be performed by a snapshot module, such as the snapshot module 216.

At block 702, a plurality of snapshots is captured by a processor of the network device, such as the network device 100 or 202. Each snapshot of the plurality of snapshots is captured at a pre-defined time interval. In an example, each snapshot depicts the value of the counter associated with the network statistics attribute of the node or data path, at a time instance at which the snapshot is captured. In an example, the snapshot may include counter value tables, such as the counter value tables for specific nodes as shown in FIG. 400 and for specific data paths as shown in FIG. 402.

At block 704, a state information of one of the node and a node in the data path may be determined based on the value of the counter depicted by each snapshot. The state information indicates workload movements in the network infrastructure. Workloads movements may refer to creation or deletion of virtual machines (VMs) associated with nodes of the network infrastructure. The state information may be determined upon analysis of the each snapshot at a control plane or a management plane of the network device.

At block 706, metadata information is associated with each snapshot. The metadata information includes at least one of a timestamp denoting the time instance at which the snapshot is being captured, the state information at the time instance, and configuration information relating to resources for which the network statistics attribute is determined. The configuration information may include unique identifiers of nodes or data paths for which the network statistics attributes are determined, direction of traffic flow, interface information, and protocol information. In some examples, the configuration information may be extracted from the network statistics request.

The metadata information may also include configuration information which includes information relating to the nodes, data paths, direction of data traffic flow, etc., for which the network statistics attribute(s) are determined. In an example, the metadata information may be included within the snapshot.

At block 708, a bundle of the plurality of snapshots may be periodically transmitting to a computing device, such as the computing device 204. The computing device may analyze the snapshots to determine patterns of network behavior.

Figure 8:
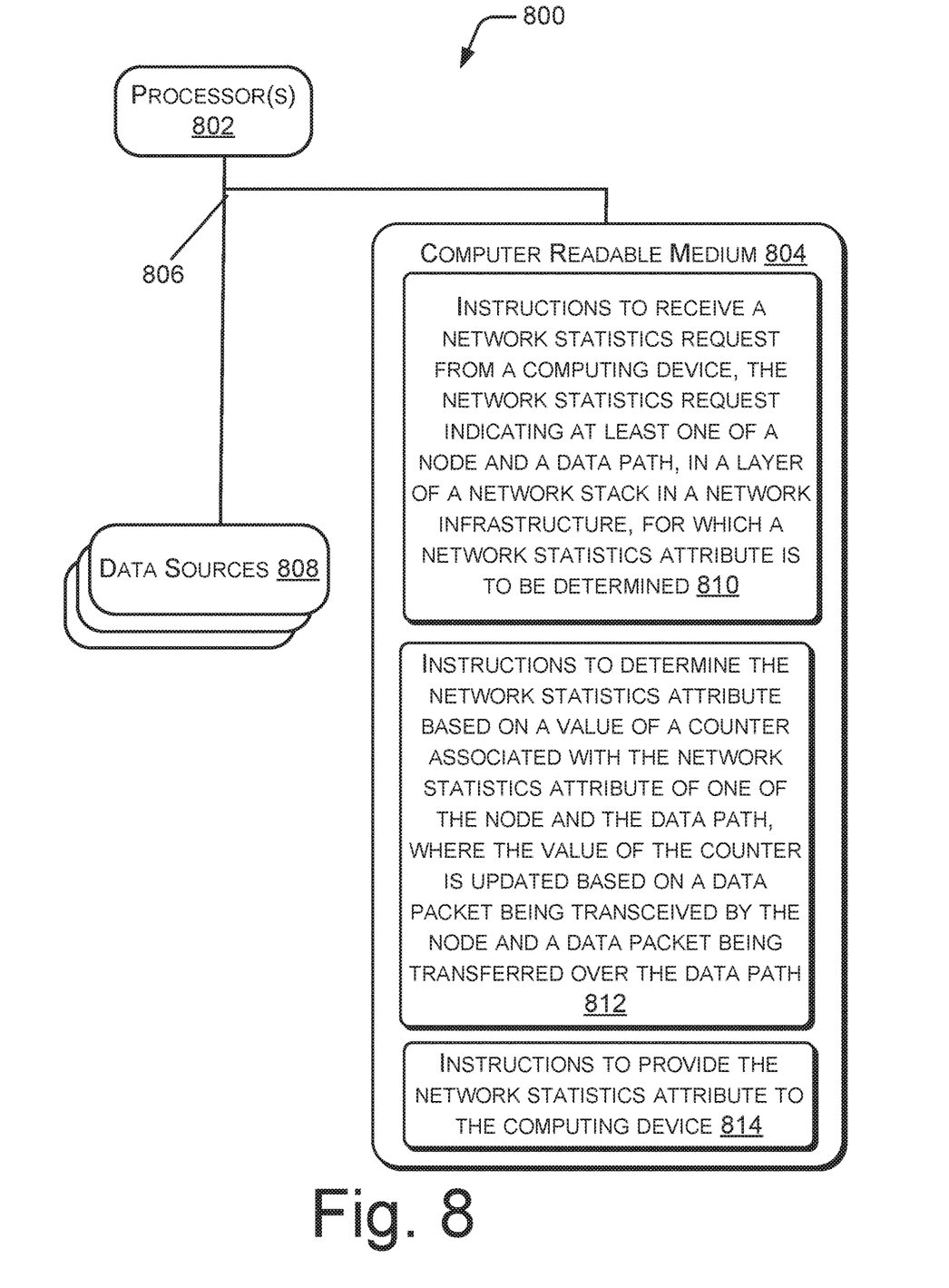
FIG. 8 illustrates a system environment implementing a non-transitory computer readable medium for managing a network infrastructure, according to an example.

FIG. 8 illustrates a system environment 800 implementing a non-transitory computer readable medium for managing a network infrastructure, according to an example.

In an example, the system environment 800 includes processor(s) 802 communicatively coupled to a non-transitory computer readable medium 804 through a communication link 806. In an example implementation, the system environment 800 may be a network device, such as the network device 100 or 202. In an example, the processor(s) 802 may have one or more processing resources for fetching and executing computer-readable instructions from the non-transitory computer readable medium 804.

The non-transitory computer readable medium 804 can be, for example, an internal memory device or an external memory device. In an example implementation, the communication link 806 may be a direct communication link, such as any memory read/write interface.

The processor(s) 802 and the non-transitory computer readable medium 804 may also be communicatively coupled to data sources 808 over the network. The data sources 808 can include, for example, memory of the system, such as the network device 100 or 202.

In an example implementation, the non-transitory computer readable medium 804 includes a set of computer readable instructions which can be accessed by the processor(s) 802 through the communication link 806 and subsequently executed to perform acts for managing a network infrastructure, such as the network infrastructure 200.

Referring to FIG. 8, in an example, the non-transitory computer readable medium 804 includes instructions 810 that cause the processor(s) 802 to receive a network statistics request from a computing device, such as the computing device 204. The network statistics request indicates at least one of a node and a data path, in a layer of a network stack in the network infrastructure, for which a network statistics attribute is to be determined. In an example, the network statistics request may be generated based on a user input in a network infrastructure management platform implemented in the computing device.

The non-transitory computer readable medium 804 includes instructions 812 that cause the processor(s) 802 to determine the network statistics attribute based on a value of a counter associated with the network statistics attribute of one of the node and the data path. The value of the counter is updated based on a data packet being transceived by the node and a data packet being transferred over the data path. In an example, the value of the counter may be incremented on data packets being transmitted or received by the node or transferred over the data path. In an example, the counter is a transceived data packet counter which stores the value indicative of one of a number of data packets transceived by the node and a number of data packets transferred over the data path. In another example, the counter is a transceived traffic volume counter which stores a value indicative of a total size of one of data packets transceived by the node and data packets transferred over the data path. In an example, multiple network statistics attributes may be determined for a node or data path.

The non-transitory computer readable medium 804 includes instructions 814 that cause the processor(s) 802 to provide the network statistics attribute to the computing device. In an example, non-transitory computer readable medium 804 may include instructions that cause the processor(s) 802 to capture a plurality of snapshots, where each snapshot of the plurality of snapshots is captured at a pre-defined time interval. Each snapshot depicts the value of the counter at a time instance at which the snapshot is captured. The non-transitory computer readable medium 804 may include further instructions that cause the processor(s) 802 to determine, based on the value of the counter depicted by each snapshot, a state information of one of the node and a node in the data path. The state information is indicative of workload movements in the network infrastructure. The state information may be determined upon analysis of the each snapshot at a control plane or a management plane of the network device.

In an example, non-transitory computer readable medium 804 may include instructions that cause the processor(s) 802 to associate metadata information with the each snapshot. The metadata information includes at least one of a timestamp denoting the time instance at which the snapshot is being captured, the state information at the time instance, and configuration information relating to resources for which the network statistics attribute is determined. In an example, non-transitory computer readable medium 804 may include instructions that cause the processor(s) 802 to periodically transmit a bundle of the plurality of snapshots to the computing device. In an example, the transmitted snapshots include the metadata information of the snapshots.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for managing a network infrastructure, the method comprising:

receiving, by a processor of a network device in the network infrastructure, a network statistics request from a computing device, the network statistics request indicating at least one of a node and a data path, in a layer of a network stack in the network infrastructure, for which a network statistics attribute is to be determined, the network statistics attribute being representative of information associated with one of data packets transceived by the node and data packets transferred over the data path, wherein the network device;

determining the network statistics attribute based on a value of a counter associated with the network statistics attribute of one of the node and the data path, wherein the value of the counter is updated based on one of a data packet being transceived by the node and a data packet being transferred over the data path;

capturing a plurality of snapshots, each snapshot of the plurality of snapshots being captured at a pre-defined time interval, wherein each snapshot depicts the value of the counter at a time instance at which the snapshot is captured;

determining, based on the value of the counter depicted by each snapshot, a state information of one of the node and a node in the data path, the state information indicative of workload movements in the network infrastructure, the state information being determined upon analysis of each snapshot at a control plane of the network device;

associating metadata information with each snapshot, wherein the metadata information includes at least one of a timestamp denoting the time instance at which the snapshot is being captured, the state information at the time instance, and configuration information relating to resources for which the network statistics attribute is determined; and periodically transmitting a bundle of the plurality of snapshots to the computing device.

2. The method as claimed in claim 1, wherein the network statistics request is generated based on a user input in a network infrastructure management platform implemented in the computing device.

3. The method as claimed in claim 1, wherein the counter is a transceived data packet counter which stores a value indicative of one of a number of data packets transceived by the node and a number of data packets transferred over the data path.

4. The method as claimed in claim 1, wherein the counter is a transceived traffic volume counter which stores a value indicative of a total size of one of data packets transceived by the node and data packets transferred over the data path.

5. The method as claimed in claim 1, wherein the network statistics attribute includes one of a transceived data packets, transceived traffic volume, and transceived data frames.

6. A network device for managing a network infrastructure, comprising:

a processor; and a memory coupled to the processor, the memory storing instructions executable by the processor to:

receive a network statistics request from a computing device, the network statistics request indicating at least one of a node and a data path, in a layer of a network stack in the network infrastructure, for which a network statistics attribute is to be determined, the network statistics attribute being representative of information associated with one of data packets transceived by the node and data packets transferred over the data path, wherein the network device comprises a first node in the network infrastructure that transceives data with a second node in the data path;

determine the network statistics attribute based on a value of a counter associated with the network statistics attribute of one of the node and the data path, wherein the value of the counter is updated based on one of a data packet being transceived by the node and a data packet being transferred over the data path;

capture a plurality of snapshots, each snapshot of the plurality of snapshots being captured at a pre-defined time interval, wherein each snapshot depicts the value of the counter at a time instance at which the snapshot is captured;

determine, based on the value of the counter depicted by each snapshot, a state information of one of the node and a node in the data path, the state information indicative of workload movements in the network infrastructure, the state information being determined upon analysis of each snapshot at a control plane of the network device;

associate metadata information with each snapshot, wherein the metadata information includes at least one of a timestamp denoting the time instance at which the snapshot is being captured, the state information at the time instance, and configuration information relating to resources for which the network statistics attribute is determined; and periodically transmit a bundle of the plurality of snapshots to the computing device.

7. The network device as claimed in claim 6, wherein the network statistics request is generated based on a user input in a network infrastructure management platform implemented in the computing device.

8. The network device as claimed in claim 6, wherein the counter is a transceived data packet counter which stores a value indicative of one of a number of data packets transceived by the node and a number of data packets transferred over the data path.

9. The network device as claimed in claim 6, wherein the counter is a transceived traffic volume counter which stores a value indicative of a total size of one of data packets transceived by the node and data packets transferred over the data path.

10. The network device as claimed in claim 6, wherein the network device comprises a router.

11. The network device as claimed in claim 6, wherein the network device is one of an interconnect switching module (ICM), a top of rack switch, a middle of rack switch, an end of row switch, a middle of row switch, a spine switch, an edge switch, an aggregation switch, and a core switch.

12. A non-transitory computer-readable medium comprising computer-readable instructions for managing a network infrastructure, the computer-readable instructions when executed by a processor, cause the processor to:

receive a network statistics request from a computing device, the network statistics request indicating at least one of a node and a data path, in a layer of a network stack in the network infrastructure, for which a network statistics attribute is to be determined, the network statistics attribute being representative of information associated with one of data packets transceived by the node and data packets transferred over the data path, wherein the network device comprises a first node in the network infrastructure that transceives data with a second node in the data path;

determine the network statistics attribute based on a value of a counter associated with the network statistics attribute of one of the node and the data path, wherein the value of the counter is updated based on a data packet being transceived by the node and a data packet being transferred over the data path;

capture a plurality of snapshots, each snapshot of the plurality of snapshots being captured at a pre-defined time interval, wherein each snapshot depicts the value of the counter at a time instance at which the snapshot is captured;

determine, based on the value of the counter depicted by each snapshot, a state information of one of the node and a node in the data path, the state information indicative of workload movements in the network infrastructure, the state information being determined upon analysis of each snapshot at a control plane of the network device;

associate metadata information with each snapshot, wherein the metadata information includes at least one of a timestamp denoting the time instance at which the snapshot is being captured, the state information at the time instance, and configuration information relating to resources for which the network statistics attribute is determined; and periodically transmit a bundle of the plurality of snapshots to the computing device.

13. The non-transitory computer-readable medium as claimed in claim 12, wherein the network statistics request is generated based on a user input in a network infrastructure management platform implemented in the computing device.

14. The non-transitory computer-readable medium as claimed in claim 12, wherein the counter is a transceived data packet counter which stores the value indicative of one of a number of data packets transceived by the node and a number of data packets transferred over the data path.

15. The non-transitory computer-readable medium as claimed in claim 12, wherein the counter is a transceived traffic volume counter which stores a value indicative of a total size of one of data packets transceived by the node and data packets transferred over the data path.

* * * * *